(12) United States Patent
Luke et al.

(10) Patent No.: US 8,089,755 B2
(45) Date of Patent: Jan. 3, 2012

(54) ELECTRONIC DEVICES WITH SURFACE FEATURES

(75) Inventors: Hok-Sum H. Luke, Bellevue, WA (US); Allen M. Han, Snoqualmie, WA (US); Thomas Chien, Taoyuan (TW); Claude Zellweger, San Francisco, CA (US)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 11/935,276

(22) Filed: Nov. 5, 2007

(65) Prior Publication Data

US 2009/0116181 A1 May 7, 2009

(51) Int. Cl.
*G06F 1/16* (2006.01)
*H04M 1/00* (2006.01)
*A63F 13/02* (2006.01)
*H01M 2/10* (2006.01)

(52) U.S. Cl. ........... 361/679.56; 361/679.55; 455/575.1; 455/566; 455/550.1; 273/148 B; 429/97; 429/100

(58) Field of Classification Search .................. 361/683, 361/689, 679.01–679.45, 679.55–679.59; D16/323; 455/566, 550.1, 90.3, 575.1; 345/156, 345/157, 168, 169; D21/364, 324; 463/36, 463/45–47; 273/148 B; 429/97, 100; D14/426, D14/427, 353–355, 405, 356, 341–347, 138, D14/496, 125, 126, 138 R, 203.1, 129, 203.7, D14/138 AA, 138 AB, 138 AC, 138 AD, D14/138 C, 138 G See application file for complete search history.

(56) References Cited

U.S. PATENT DOCUMENTS

| | | | |
|---|---|---|---|
| D313,413 S * | 1/1991 | Langton | D14/138 AA |
| D336,644 S * | 6/1993 | Thackray | D14/126 |
| 6,144,552 A | 11/2000 | Whitcher et al. | |
| D461,803 S * | 8/2002 | Griffin et al. | D14/346 |
| D488,452 S * | 4/2004 | Chung | D14/138 AB |
| D508,029 S * | 8/2005 | Lee | D14/138 AB |
| D537,063 S * | 2/2007 | Kim et al. | D14/138 AD |
| 2001/0019947 A1* | 9/2001 | Michel et al. | 455/90 |
| 2001/0036845 A1* | 11/2001 | Park | 455/566 |
| 2004/0179342 A1 | 9/2004 | Pritchard et al. | |
| 2004/0233625 A1* | 11/2004 | Saitou et al. | 361/683 |
| 2007/0041149 A1 | 2/2007 | Homer et al. | |

FOREIGN PATENT DOCUMENTS

| | | |
|---|---|---|
| DE | 7245574 | 3/1973 |
| DE | 8030209 | 3/1981 |
| DE | 202006009630 | 8/2006 |

OTHER PUBLICATIONS

European Search Report for Application No. EP08104377; Applicant:High Tech Computer Corp. (HTC); Date of Mailing: Apr. 12, 2008 (7 pages).

* cited by examiner

*Primary Examiner* — Jayprakash N Gandhi
*Assistant Examiner* — Nidhi Desai
(74) *Attorney, Agent, or Firm* — Perkins Coie LLP (57) ABSTRACT

Electronic devices with surface features are disclosed. The electronic devices includes a processor and a display operatively coupled to the processor for presenting outputs to a user. The electronic devices also includes a housing having a first portion and a second portion coupled to the first portion to form an enclosure containing the processor and the display. The second portion includes a plurality of edges proximate to the first portion, an end surface spaced apart from the edges, and a plurality of side surfaces extending between the edges and the end surface. At least one of the side surfaces is canted relative to the end surface.

17 Claims, 6 Drawing Sheets

ELECTRONIC DEVICES WITH SURFACE FEATURES

TECHNICAL FIELD

The present disclosure relates to electronic devices having surface features. In particular, aspects of the present disclosure relate to mobile communication and/or computing devices having surface features.

BACKGROUND

Portable electronic devices (e.g., mobile phones, personal data assistants, laptops, etc.) are widely used today for communication and computing applications. Conventional portable electronic devices typically include generally flat exterior surfaces to reduce development and production cost. However, a user may have difficulty stably holding such an electronic device in a desirable position because the flat exterior surfaces typically cannot adequately accommodate contours of the user's fingers. The flat exterior surfaces can also reduce the mechanical strength of the electronic device because flat surfaces can readily transmit, instead of dispersing, applied forces. These limitations can reduce the user's satisfaction with operating the electronic device.

DETAILED DESCRIPTION

The present disclosure describes electronic devices having surface features and associated methods. Several of the details set forth below are provided to describe the following embodiments in a manner sufficient to enable a person skilled in the relevant art to make and use the disclosed embodiments. Several of the details and features described below, however, may not be necessary to practice certain embodiments of the disclosure. Additionally, the disclosure can include other embodiments that are within the scope of the claims but are not described in detail with respect to FIGS. 1-6.

Figure 1A:
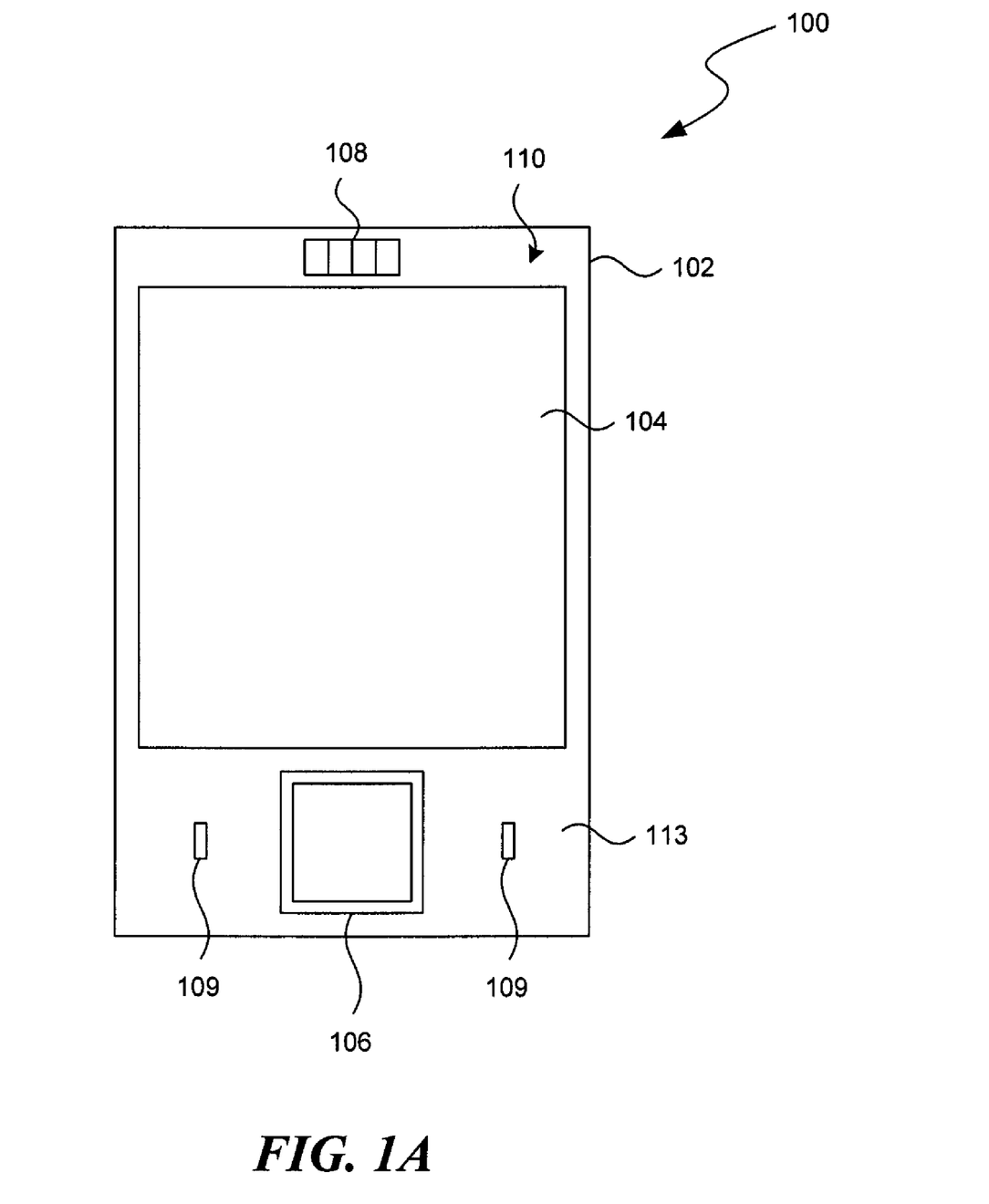
FIGS. 1A-C are a front view, a side view, and a back view, respectively, of an electronic device configured in accordance with an embodiment of the disclosure.
Figure 1B:
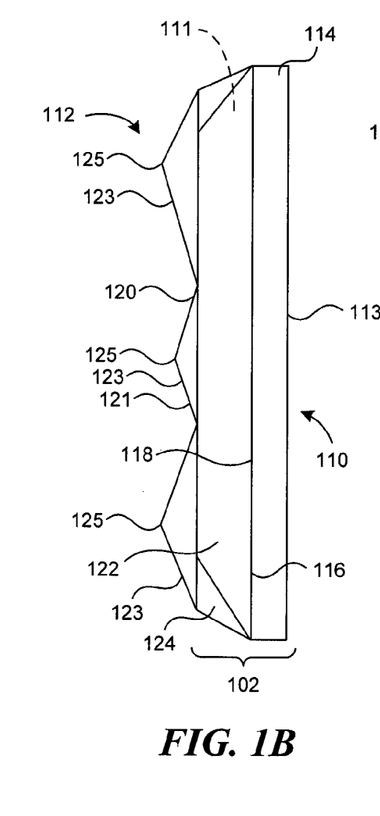
Figure 1C:
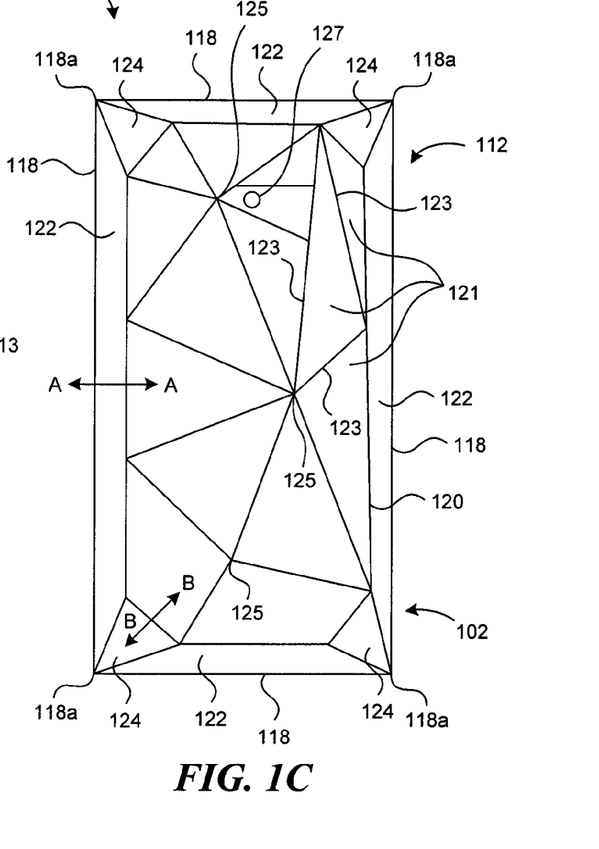
Figure 1D:
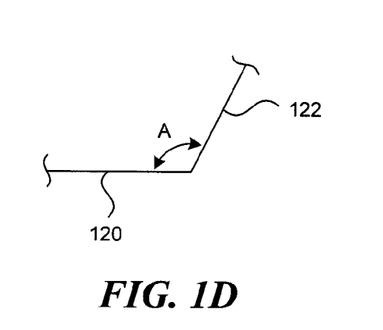
FIG. 1D is a partially cross-sectional view of the electronic device in FIG. 1C taken along line A-A.

Embodiments of an electronic device 100 having surface features are described below with reference to FIGS. 1A-C. FIG. 1A is a front view; FIG. 1B is a side view; and FIG. 1C is a back view of the electronic device 100. As illustrated in FIG. 1A, the electronic device 100 includes a housing 102 that can carry input components (e.g., a directional keypad 106 and input keys 109), output components (e.g., a display 104 and a speaker 108), and/or other communication/computing components generally found in PDA devices, cellular phones, laptop computers, tablet PCs, smart phones, hand-held email devices, and/or other mobile communication/computing devices.

Referring to FIG. 1A, FIG. 1B, and FIG. 1C together, the housing 102 can include a first portion 110 and a second portion 112 (e.g., a battery cover) proximate to the first portion 110. In certain embodiments, the first and second portions 110, 112 cooperate to form an enclosure having an internal cavity 111 that can accommodate a processor, an input circuitry, an output circuitry, a data storage device, and/or other electronic and/or mechanical components of the electronic device 100, as described in more detail below with reference to FIG. 2. In other embodiments, the housing 102 can also include at least one intermediate portion positioned between the first and second portions 110, 112 and/or other structural components to form the enclosure of the housing 102.

The first portion 110 can include a first end surface 113 at which the input components, output components, and/or other communication/computing components can be positioned, a plurality of first edges 116 (only one is shown for clarity) spaced apart from the first end surface 113, and a plurality of first side surfaces 114 extending between the first end surface 113 and the first edges 116. In the illustrated embodiment, the first end surface 113 is generally planar and substantially rectangular in shape, and the first side surfaces 114 extend generally perpendicularly from the first end surface 113. In other embodiments, at least one of the first end surface 113 and the first edges 116 can be curved, surface segmented, or otherwise nonplanar. In further embodiments, at least one of the first side surfaces 114 can be canted relative to the first end surface 113.

The second portion 112 can include a plurality of second edges 118 proximate to the first edges 116 of the first portion 110 and a second end surface 120 spaced apart from the second edges 118. The second end surface 120 is opposite to the first end surface 113. The first and/or second portions 110, 112 can include structural features to mate with one another at the first and second edges 116, 118. For example, the first and second portions 110, 112 can include corresponding grooves, channels, slots, holes, and/or other types of structural features at the first and second edges 116, 118 for coupling the first portion 110 to the second portion 112 via, e.g., compression. In other examples, the first and/or second portions 110, 112 can include a fastener, an adhesive, and/or another connecting mechanism for mutual connection. In the illustrated embodiment, the first and second edges 116, 118 are generally straight. In other embodiments, the first and second edges 116, 118 can have corresponding curves, canted angles, and/or other non-linear profile features. In a particular embodiment, the second portion 112 includes a battery cover for protecting a battery (not shown) held inside the internal cavity 111.

In certain embodiments, the second end surface 120 can be at least partially nonplanar. For example, as shown in FIGS. 1B-C, the second end surface 120 can include a plurality of generally planar surface segments 121 that are canted relative to one another and/or relative to the first end surface 113 (e.g., forming an angle of about 170° to about 180° relative to the first end surface 113). As a result, two adjacent surface segments 121 can intercept one another to form a boundary 123, and at least two boundaries 123 can intercept one another to form an apex 125 protruding from the second portion 112. As illustrated in FIG. 1C, the adjacent surface segments 121 intercept one another to form a plurality of boundaries 123 between each pair of the surface segments, and the plurality of boundaries 123 intercept one another to form three apexes 125 protruding from the second end surface 120. The boundaries 123 can be sharp or smooth. In the illustrated embodiment, the second end surface 120 has a substantially octagonal shape. In other embodiments, the second end surface 120 can also have a rectangular shape, a trapezoidal shape, a pentagonal shape, and/or other polygonal shape.

In the illustrated embodiment, individual surface segments 121 have a triangular shape or a tetragonal shape. In other embodiments, individual surface segments 121 can also have a rectangular shape, a trapezoidal shape, a pentagonal shape, and/or other polygonal shape. In yet other embodiments, at least some of the surface segments 121 can have a circular shape, a semicircular shape, and/or another at least partially curved shape. As a result, at least one of the boundaries 123 can be at least partially curved.

In further embodiments, in addition to or in lieu of the features of the embodiments discussed above, the second end surface 120 can also include at least one surface segment 121 that has a concave surface, a convex surface, and/or other curved surface. In other embodiments, some of the surface segments 121 can be generally planar and parallel to the first end surface 113. In yet further embodiments, all of the surface segments 121 are generally co-planar with one another so that the second end surface 120 is generally planar.

Figure 1E:
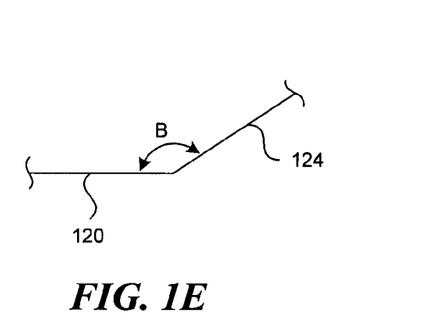
FIG. 1E is a partially cross-sectional view of the electronic device in FIG. 1C taken along line B-B.

The second portion 112 can also include a plurality of second side surfaces 122 (four are shown for illustration purposes) extending between the second end surface 120 and the second edges 118. In certain embodiments, individual second side surfaces 122 can be canted, for example, by forming an angle A (as shown in FIG. 1E) of about 110° to about 130°, preferably about 115° to about 125°, relative to the second end surface 120. Each of the second side surfaces 122 can form generally the same or a different angle with the second end surface 120. In other embodiments, the second side surfaces 122 can be generally planar relative to the first side surface 114. In further embodiments, the second side surfaces 122 can be omitted, and the nonplanar second end surface 120 can extend substantially to the second edges 118. In yet further embodiments, the second side surfaces 122 can be convex, concave, and/or otherwise curved.

In the illustrated embodiments, the second portion 112 optionally includes at least one corner surface 124 (four are shown for illustration purposes) intercepting the second end surface 120, the second side surfaces 122, and the second edges 118. Each of the corner surfaces 124 extends from the second end surface 120 to an intersection 118a formed by two adjacent second edges 118. The corner surfaces 124 can be generally planar or curved. In the illustrated embodiment, the corner surfaces 124 have a triangular shape and form an angle B of about 140° to about 160°, preferably about 145° to about 155°, relative to the second end surface 120. In other embodiments, the corner surfaces 124 can also have a tetragonal shape and/or other polygonal shape.

Figure 2:
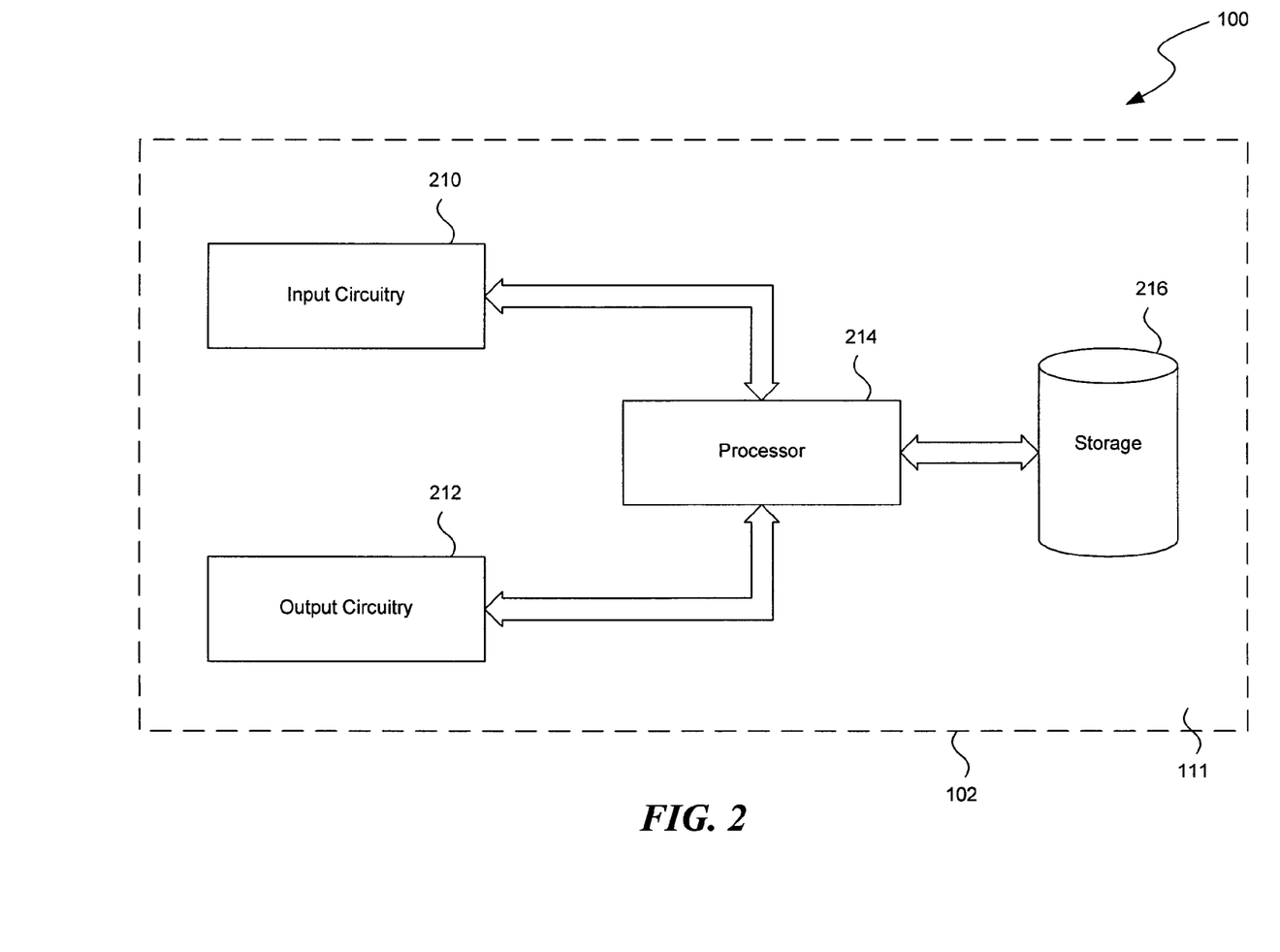
FIG. 2 is a functional schematic view of internal components of the electronic device in FIGS. 1A-C, configured in accordance with an embodiment of the disclosure.

FIG. 2 is a functional schematic view of internal components of the electronic device 100 in FIGS. 1A-C. As shown in FIG. 2, the electronic device 100 can include an input circuitry 210, an output circuitry 212, a processor 214, and a storage 216 operatively connected to one another. At least some of these components can be housed in the internal cavity 111 of the housing 102. The input circuitry 210 can include analog and/or digital signal controllers for sampling input signals from, e.g., the directional keypad 106 (FIG. 1), the input keys 109 (FIG. 1), and/or other input components of the electronic device 100.

The processor 214 can include a microelectronic logic processor for processing signals supplied by the input circuitry 210 according to instructions stored in the storage 216, and outputting results to the output circuitry 212. A suitable processor 214 can include an OMAP 850 processor supplied by Texas Instruments of Dallas, Tex., running a Windows Mobile® 6.0 operating system supplied by Microsoft Corporation of Redmond, Wash.

The output circuitry 212 can include circuits and/or controllers for converting signals from the processor 214 to those suitable for output at, e.g., the speaker 108 (FIG. 1), the display 104 (FIG. 1), and/or other output components. For example, the output circuitry 212 can include an LCD display controller for controlling the display 104.

The storage 216 can include a hard drive, a flash ROM, an EPROM, and/or another suitable persistent computer-readable medium for storing instructions, records, and other data. For example, instructions for processing user input can be stored in the storage 216. These instructions can be at least partially incorporated into the operating system or can be an independent application.

Figure 3:
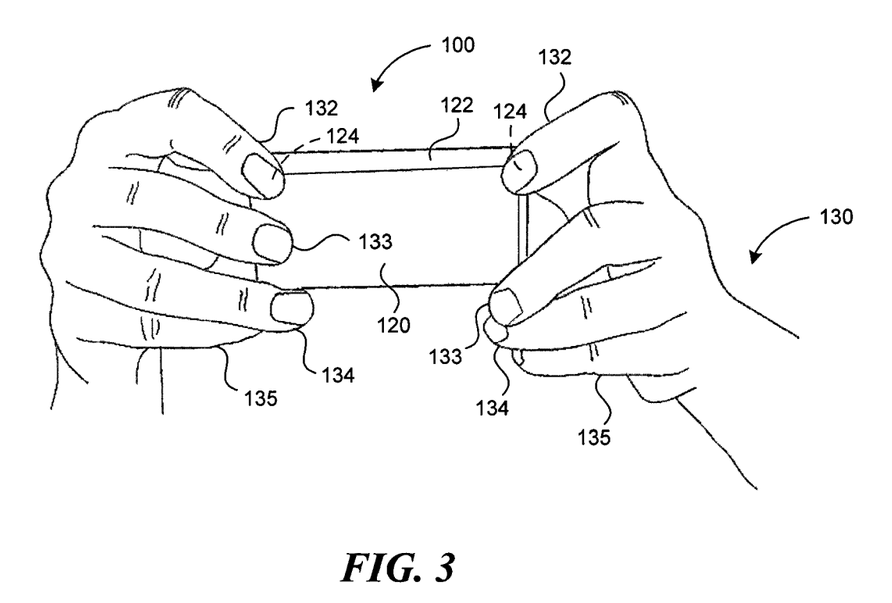
FIG. 3 is a perspective view of a user holding the electronic device in FIGS. 1A-C.
Figure 4:
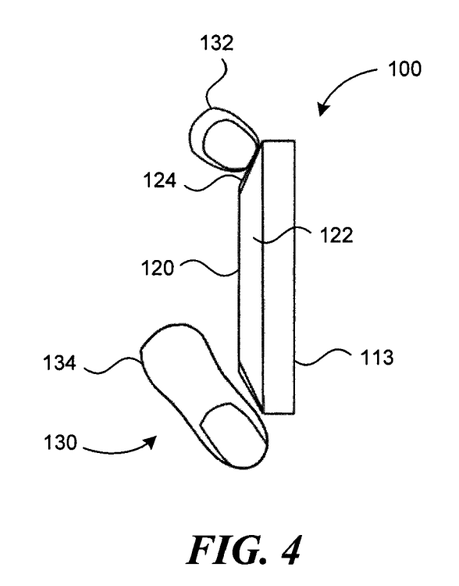
FIG. 4 is a side view of a user holding the electronic device in FIGS. 1A-C.

Embodiments of the electronic device 100 can enable a user to stably and comfortably operate the electronic device 100. For example, as illustrated in FIG. 3, the corner surfaces 124 can provide a stable platform for a user 130 to comfortably rest index fingers 132 of the user 130. The corner surfaces 124 and/or the second side surfaces 122 can also allow the index fingers 132, the middle fingers 133, the ring fingers 134, and/or the little fingers 135 of the user 130 to rest naturally when the user 130 holds the electronic device 100 by forming a specific angle that at least partially corresponds to a particular viewing angle of the user 130. Further, as illustrated in FIG. 4, the corner surfaces 124 can also be configured to conform to the contours of the index finger 132, the ring finger 134, and/or other fingers of the user 130 and thus to provide improved comfort when holding the electronic device 100.

Figure 5:
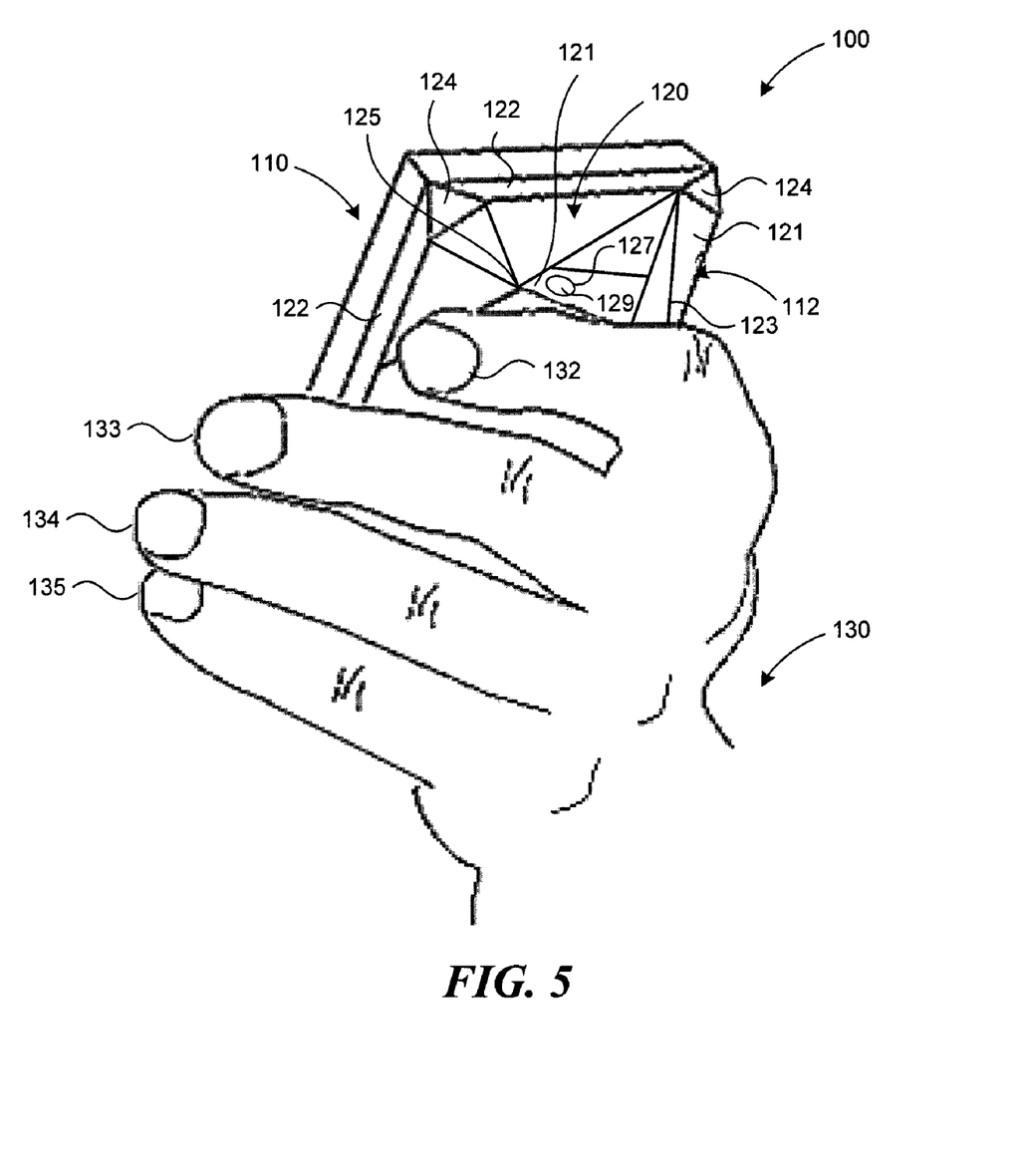
FIG. 5 is another perspective view of a user holding the electronic device in FIGS. 1A-C.

In certain embodiments, the second end surface 120 can guide the fingers of the user 130 via tactility. For example, as illustrated in FIG. 5, the electronic device 100 can optionally include a camera 127 carried by the housing 102 and having a lens 129 proximate to the second end surface 120. The user 130 can touch the second end surface 120 and recognize a position of his fingers relative to the lens 129 by sensing the boundaries 123 separating individual surface segments 121 and/or at least one apex 125. As a result, the user 130 can avoid touching the lens 129 and/or other components of the electronic device 100 when operating the electronic device 100.

Figure 6:
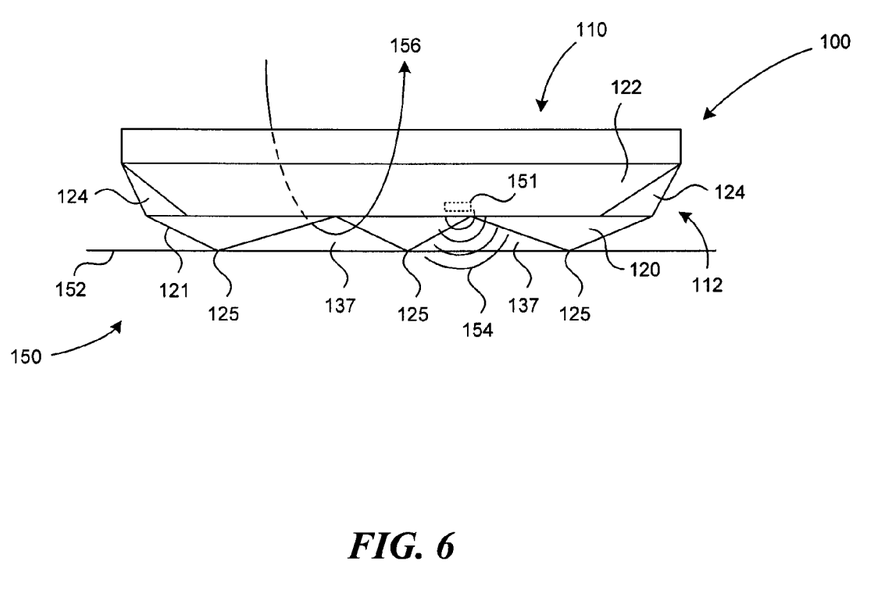
FIG. 6 is a side view of the electronic device in FIGS. 1A-C positioned on a support and configured in accordance with a further embodiment of the disclosure.

In other embodiments, the second end surface 120 can also improve the stability of the electronic device 100 when placed on a support. FIG. 6 is a side view of the electronic device 100 in FIGS. 1A-C positioned on a support 150 having a generally planar support surface 152. As shown in FIG. 6, when the electronic device 100 is placed on the support 150, only the apexes 125 (three are shown for illustration purposes) contact the support surface 152. The three apexes 125 can enable the electronic device 100 to be stably placed on the support surface 152, and can allow the surface segments 121 extending from the apexes 125 not to contact the support surface 152. As a result, the friction between these surface segments 121 and the support surface 152 can be at least reduced or even avoided, thus reducing the risk of damaging the surface segments 121 and/or other components proximate to the surface segments 121 (e.g., the lens 129 shown in FIG. 5). In some embodiments, the apexes 125 can also be reinforced with rubber, plastic, metal, glass, and/or other material with sufficient strength to improve the structural integrity of the electronic device 100.

The second end surface 120 can also improve cooling the electronic device 100 during operation. As illustrated in FIG. 6, contacting the support surface 152 can create air gaps 137 between the support surface 152 and the second end surface 120 of the electronic device 100. The air gaps 137 can allow cooling air (as indicated by an arrow 156) to flow between the electronic device 100 and the support surface 152. The cooling air can carry away heat generated by the electronic device 100 during operation via convection, conduction, and/or radiation. As a result, the electronic device 100 can have improved heat dissipation and performance by having the second end surface 120.

Embodiments of the electronic device 100 with the second end surface 120 can also have improved acoustic performance. In certain embodiments, the electronic device 100 can optionally include a sound generator 151 (e.g., a ringer) and/or other acoustic components disposed at least proximate to the second end surface 120. During operation, the air gaps 137 can allow sound waves 154 to easily propagate from the sound generator 151 with at least reduced attenuation and/or interference from the support surface 152, thus improving acoustic performance of the electronic device 100.

From the foregoing, it will be appreciated that specific embodiments of the disclosure have been described herein for purposes of illustration but that various modifications may be made without deviating from the disclosure. Certain aspects of the disclosure described in the context of particular embodiments may be combined or eliminated in other embodiments. Further, while features associated with certain embodiments of the disclosure have been described in the context of those embodiments, other embodiments may also possess such features, and not all embodiments need necessarily the same features to fall within the scope of the disclosure. Accordingly, the disclosure is not limited except as by the appended claims.

We claim:

1. An electronic device, comprising:
    a processor;
    a display operatively coupled to the processor for presenting output to a user;
    a housing having a first portion and a second portion coupled to the first portion to form an enclosure containing the processor and the display, wherein the display is positioned at a surface of the first portion and the second portion includes a plurality of edges proximate to the first portion, an end surface spaced apart from the edges, four side surfaces extending between the edges and the end surface and canted relative to the end surface, and four corner surfaces canted relative to and between the end surface and two adjacent side surfaces, wherein the end surface has a substantially octagonal shape and is positioned opposite to the surface of the first portion, and the end surface includes a plurality of triangular surface segments that are canted relative to one another and form at least three apexes non-linearly protruding from the end surface, wherein each of the at least three apexes protrudes an approximately equal distance from the end surface and wherein each apex is a point of maximum distance from the end surface; and
    an electronic component proximate to one of the triangular surface segments.

2. The electronic device of claim 1 wherein each of the four side surfaces forms an angle of about 110° to about 130° relative to the end surface.

3. The electronic device of claim 1 wherein each of the four corner surfaces forms an angle of about 140° to about 160° relative to the end surface.

4. The electronic device of claim 1 wherein each of the corner surfaces has a triangular shape.

5. The electronic device of claim 1 wherein the triangular surface segments form an angle of about 170° to about 180° relative to one another.

6. The electronic device of claim 5 wherein two adjacent triangular surface segments intercept each other to form a boundary between the two adjacent triangular surface segments.

7. The electronic device of claim 1 wherein the triangular surface segments intercept one another to form a plurality of boundaries between each pair of the triangular surface segments, and further wherein two adjacent boundaries intercept one another to form one of the at least three apexes.

8. The electronic device of claim 1 wherein the triangular surface segments intercept one another to form a plurality of boundaries between each pair of the triangular surface segments, and further wherein at least one of the boundaries is a smooth boundary.

9. The electronic device of claim 1 wherein at least one of the triangular surface segments has an at least partially curved shape.

10. The electronic device of claim 1 wherein at least one of the triangular surface segments is convex or concave.

11. An electronic device, comprising:
    a processor;
    a display operatively coupled to the processor for presenting output to a user;
    a housing having a first portion and a second portion coupled to the first portion to form an enclosure containing the processor, wherein the display is positioned at a surface of the first portion and the second portion includes a plurality of edges proximate to the first portion, an end surface opposite to the surface of the first portion and spaced apart from the edges, a plurality of side surfaces extending between the edges and the end surface, and a corner surface between two adjacent side surfaces and the end surface, wherein the end surface includes a plurality of triangular surface segments that are canted relative to one another and form at least three apexes non-linearly protruding from the end surface, wherein each of the at least three apexes protrudes an approximately equal distance from the end surface, wherein each apex is a point of maximum distance from the end surface, and wherein at least one of the side surfaces is canted relative to the end surface; and
    an electronic component proximate to one of the triangular surface segments.

12. The electronic device of claim 11 wherein the plurality of triangular surface segments are generally planar, and wherein two adjacent triangular surface segments intercept each other to form a boundary between the two adjacent triangular surface segments.

13. The electronic device of claim 11 wherein the plurality of triangular surface segments are generally planar, and wherein the adjacent triangular surface segments intercept one another to form a plurality of boundaries between each pair of the triangular surface segments, and further wherein two adjacent boundaries intercept one another to form one of the at least three apexes.

14. A battery cover for an electronic device having an electronic component, comprising: a body having a plurality of edges positioned to be proximate to the electronic device, an end surface spaced apart from the edges, a plurality of side surfaces extending between the edges and the end surface, and canted relative to the end surface, and a plurality of corner surfaces canted relative to and between the end surface and two adjacent side surfaces, wherein the end surface has a substantially octagonal shape and is positioned to be opposite to a front surface of the electronic device, the end surface having a plurality of triangular surface segments that are generally planar and canted relative to one another and form at least three apexes non-linearly protruding from the end surface, wherein each of the at least three apexes protrudes an approximately equal distance from the end surface, wherein each apex is a point of maximum distance from the end surface, wherein one of the triangular surface segments is configured to be proximate to the electronic component; and at least one connection portion carried by the body for connecting the battery cover to a housing of the electronic device.

15. The battery cover of claim 14 wherein the body further has a plurality side surfaces extending from the end surface, and at least one of the side surfaces forms an angle of about 110° to about 130° relative to the end surface.

16. The battery cover of claim 14 wherein the end surface has a substantially octagonal shape.

17. The electronic device of claim 1, 7,or 11, wherein the electronic component is a camera having a lens proximate to the one of the triangular surface segments.

* * * * *

UNITED STATES PATENT AND TRADEMARK OFFICE
CERTIFICATE OF CORRECTION

PATENT NO. : 8,089,755 B2  
APPLICATION NO. : 11/935276  
DATED : January 3, 2012  
INVENTOR(S) : Hok-Sum H. Luke et al.

Page 1 of 1

It is certified that error appears in the above-identified patent and that said Letters Patent is hereby corrected as shown below:

Title Page, Item (75), "Inventors", line 3, delete "Thomas Chien," and insert -- Chih-Ling Chien, --, therefor.

In column 8, line 4, in claim 15, delete "plurality" and insert -- plurality of --, therefor.

In column 8, line 9, in claim 17, delete "1, 7,or 11," and insert -- 1 or 11, --, therefor.

Signed and Sealed this
Twenty-ninth Day of May, 2012

David J. Kappos
*Director of the United States Patent and Trademark Office*